(12) United States Patent
Hoeink et al.

(10) Patent No.: US 10,302,814 B2
(45) Date of Patent: May 28, 2019

(54) MECHANISMS-BASED FRACTURE MODEL FOR GEOMATERIALS

(71) Applicants: Tobias Hoeink, Houston, TX (US); Aleksander Zubelewicz, Los Alamos, NM (US)

(72) Inventors: Tobias Hoeink, Houston, TX (US); Aleksander Zubelewicz, Los Alamos, NM (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 917 days.

(21) Appl. No.: 14/831,254

(22) Filed: Aug. 20, 2015

(65) Prior Publication Data

US 2017/0052283 A1 Feb. 23, 2017

(51) Int. Cl.
*G01V 99/00* (2009.01)
*E21B 43/26* (2006.01)

(52) U.S. Cl.
CPC ............ *G01V 99/005* (2013.01); *E21B 43/26* (2013.01)

(58) Field of Classification Search
CPC ........ G01V 99/005; G06F 17/50; E21B 43/26
See application file for complete search history.

(56) References Cited

U.S. PATENT DOCUMENTS

| | | | |
|---|---|---|---|
| 6,795,773 B2* | 9/2004 | Soliman | E21B 43/26 166/250.1 |
| 9,316,568 B2 | 4/2016 | He et al. | |
| 2006/0131074 A1 | 6/2006 | Calhoun et al. | |

(Continued)

FOREIGN PATENT DOCUMENTS

WO 2014105659 A1 7/2014

OTHER PUBLICATIONS

Jordan Schofield, "Optimization of hydraulic fracture stimulation in field development," Sep. 2014, Imperial College London, 38 pages.*

(Continued)

*Primary Examiner* — Kamini S Shah
*Assistant Examiner* — Russ Guill
(74) *Attorney, Agent, or Firm* — Cantor Colburn LLP

(57) ABSTRACT

A method for stimulating an earth formation according to a stimulation scenario for extracting hydrocarbons from the earth formation includes: selecting an earth formation stimulation scenario; applying a modified Mohr-Coulomb model that is configured to estimate behavior of a rock formation during the stimulation scenario, the modified Mohr-Coulomb model having a term representing dilatation in an out-of-plane orientation; predicting a fracture and damage network using the modified Mohr-Coulomb model; converting the fracture and damage network into permeability; simulating fluid flow in the earth formation using the permeability to predict hydrocarbon production; computing a value of a metric for hydrocarbon production for the selected stimulation scenario; iterating the selecting, applying, predicting, converting, simulating, and computing until the metric value meets or exceeds a threshold value; and stimulating the earth formation using a stimulation treatment system according to the stimulation scenario having the metric value that meets or exceeds the threshold value.

14 Claims, 5 Drawing Sheets

(56) References Cited

U.S. PATENT DOCUMENTS

| | | | |
|---|---|---|---|
| 2009/0005996 A1* | 1/2009 | Delorme | E21B 43/00 702/12 |
| 2010/0128932 A1 | 5/2010 | Dvorkin et al. | |
| 2010/0135536 A1 | 6/2010 | Dvorkin et al. | |
| 2011/0015907 A1 | 1/2011 | Crawford et al. | |
| 2011/0029293 A1 | 2/2011 | Petty et al. | |
| 2012/0166088 A1 | 6/2012 | Sallee et al. | |
| 2013/0000895 A1 | 1/2013 | Walters et al. | |
| 2013/0006597 A1* | 1/2013 | Craig | E21B 43/16 703/10 |
| 2013/0090902 A1 | 4/2013 | Yao et al. | |
| 2013/0199787 A1 | 8/2013 | Dale et al. | |
| 2013/0211807 A1 | 8/2013 | Barrett et al. | |
| 2013/0308831 A1 | 11/2013 | Dvorkin et al. | |
| 2015/0043787 A1 | 2/2015 | Fredrich et al. | |
| 2015/0204174 A1* | 7/2015 | Kresse | E21B 43/26 166/250.01 |
| 2016/0108705 A1* | 4/2016 | Maxwell | E21B 43/267 166/250.1 |
| 2017/0003263 A1 | 1/2017 | Huang et al. | |
| 2017/0275970 A1 | 9/2017 | Crawford et al. | |
| 2017/0277812 A1 | 9/2017 | Holland et al. | |

OTHER PUBLICATIONS

Xiao-Dong Pan et al., "Influence of axial stress and dilatancy on rock tunnel stability," 1996, Journal of Geotechnical Engineering, vol. 122, No. 2, pp. 139-146.*

Johan Christian Clausen et al., "A simple and efficient FEM-Implementation of the modified Mohr-Coulomb criterion," 2006, Proceedings of the 19th Nordic Seminar on Computational Mechanics, 7 pages.*

Hoonil Seol et al., "Shear load transfer for rock-socketed drilled shafts based on borehole roughness and geological strength index (GSI)," 2008, International Journal of Rock Mechanics & Mining Sciences, vol. 45, pp. 848-861.*

International Search Report and the Written Opinion of the International Searching Authority; PCT/US2017/023161; Korean Intellectual Property Office; dated Jun. 15, 2017; 8 pages.

FY14 Annual Progress Report; Laboratory Directed Research and Development; Mar. 2015; 895 pages.

Hoeink, et al.; "Mechanisms-based Fracture Model for Geological Materials"; V3 Apr. 16, 2015; 11pages.

Notification of Transmittal of the International Search Report and the Written Opinion of the International Searching Authority, or the Declaration; PCT/US2016/046181; 11 pages, dated Nov. 16, 2016.

Sarris et al.; "The influence of pumping parameters in fluid-driven fractures in weak porous formations"; International Journal for Numerical and Analytical Methods in Geomechanics; 2014; John Wiley & Sons, Ltd.; 21 pages.

Zubelewicz, et al. "Dynamic Behavior of Copper Under Extreme Loading Rates"; J. Phys. IV France 134 (2006); 5 pages.

Zubelewicz, et al.; A Constitutive Model for a Uranium-Niobium Alloy; Journal of Applied Physics 100; (2006); 8 pages.

Zubelewicz, et al.; "A Mechanisms-based model for dynamic behavior and fracture of geomaterials"; Internatiional Journal of Rock Mechanics & Mining Sciences 72 (2014); 6 pages.

Zubelewicz, et al.; "Constitutive Model with Rotating Active Plane and True Stress";Retrieved from the internet; URL:http://pubs.asce.org/c; 19 pages, Mar. 1987.

Zubelewicz, et al.; "Geometric Interpretation for Huber-von Mises Plasticity"; Apr. 2014; Retrieved from the internet; URL:http://www.researchgate.net/publication/275334193; 8 pages.

Zubelewicz, et al.; "MicroMechanical Study of Ductile and PolyCrystalline Materials";Nov. 1993; Journal of the Mechanics and Physics of Solids; 13 pages.

Zubelewicz, et al.; Fracture Model for Cemented Aggregates; AIP Advances 3, 012119 (2013); 11 pages.

Zubelewicz,Aleksander; "Overall Stress and Strain Rates for Crystalline and Frictional Materials";Int. J. Non-Linear Mecahnics; vol. 25, No. 4;5 pages, 1990.

* cited by examiner

MECHANISMS-BASED FRACTURE MODEL FOR GEOMATERIALS

BACKGROUND

Hydraulic fracturing is commonly used to fracture tight earth formations such as shale in order to extract hydrocarbons such as oil or gas. Hydraulic fracturing results in a distribution of macro-fractures and micro-cracks in rock formations. These fractures, once opened, increase the flow of hydrocarbons to make their extraction feasible.

A mechanisms-based model that is able to simulate physical processes relevant to fluid-driven fracture processes at depth would be useful in optimizing hydrocarbon production. Phenomenological models rely on a long-term trial-and-error approach and offer desired material responses but often only within experimentally verified regimes. Unfortunately, extrapolations into untested regimes are frequently unsuccessful. Hence, a more accurate model for simulating the physical processes would be well received in the hydrocarbon production industries.

BRIEF SUMMARY

Disclosed is a method for stimulating an earth formation according to a selected stimulation scenario for extracting hydrocarbons from the earth formation. The method includes: selecting a stimulation scenario for stimulating the earth formation using a processor; applying a modified Mohr-Coulomb model that is configured to estimate behavior of a rock formation during the stimulation scenario using the processor, the modified Mohr-Coulomb model having a term representing dilatation in an out-of-plane orientation; predicting, with the processor, a fracture and damage network using the modified Mohr-Coulomb model; converting the fracture and damage network into permeability using the processor; simulating, with the processor, fluid flow in the earth formation using the permeability to predict hydrocarbon production; computing, with the processor, a value of a metric for hydrocarbon production for the selected stimulation scenario; iterating, with the processor, the selecting, the applying, the predicting, the converting, the simulating, and the computing until the metric value meets or exceeds a threshold value; and stimulating the earth formation using a stimulation treatment system according to the stimulation scenario having the metric value that meets or exceeds the threshold value.

Also disclosed is a system for stimulating an earth formation according to a selected stimulation scenario for extracting hydrocarbons from the earth formation. The system includes a stimulation treatment system configured to stimulate the earth formation according to a stimulation scenario for extraction of the hydrocarbons and a processor. The processor is configured for: selecting a stimulation scenario for stimulating the earth formation; applying a modified Mohr-Coulomb model that is configured to estimate behavior of a rock formation during the stimulation scenario, the modified Mohr-Coulomb model having a term representing dilatation in an out-of-plane orientation; predicting a fracture and damage network using the modified Mohr-Coulomb model; converting the fracture and damage network into permeability; simulating fluid flow in the earth formation using the permeability to predict hydrocarbon production; computing a value of a metric for hydrocarbon production for the selected stimulation scenario; iterating the selecting, the applying, the predicting, the converting, the simulating, and the computing until the metric value meets or exceeds a threshold value; and stimulating the earth formation using the stimulation treatment system according to the stimulation scenario having the metric value that meets or exceeds the threshold value.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed is a method for selecting a stimulation scenario for extracting hydrocarbons from an earth formation. In general, the hydrocarbon production action is selected to optimize production such as, for example, a maximum cumulative production over a specific time interval. The method involves selecting a stimulation or hydraulic fracturing scenario that includes parameters for implementing the scenario such as hydraulic pressures, flow rates, type of fluid and/or type and amount of proppant. The method further involves applying a modified Mohr-Coulomb model to simulate behavior of subsurface rock during the selected stimulation scenario. The modified Mohr-Coulomb model is different from and novel over conventional Mohr-Coulomb models. A fracture and damage network is predicted using the modified Mohr-Coulomb model. The fracture and damage network is then converted into permeability. Simulation of the reservoir is conducted using the permeability to predict hydrocarbon production. A hydrocarbon production metric is selected and a metric value is computed for the selected stimulation scenario. The stimulation scenario is then changed and the above actions iterated until an optimum metric value is determined. Once the optimum metric value is determined, the formation is stimulated using the stimulation scenario associated with optimum metric value and hydrocarbons are extracted.

Figure 1A:
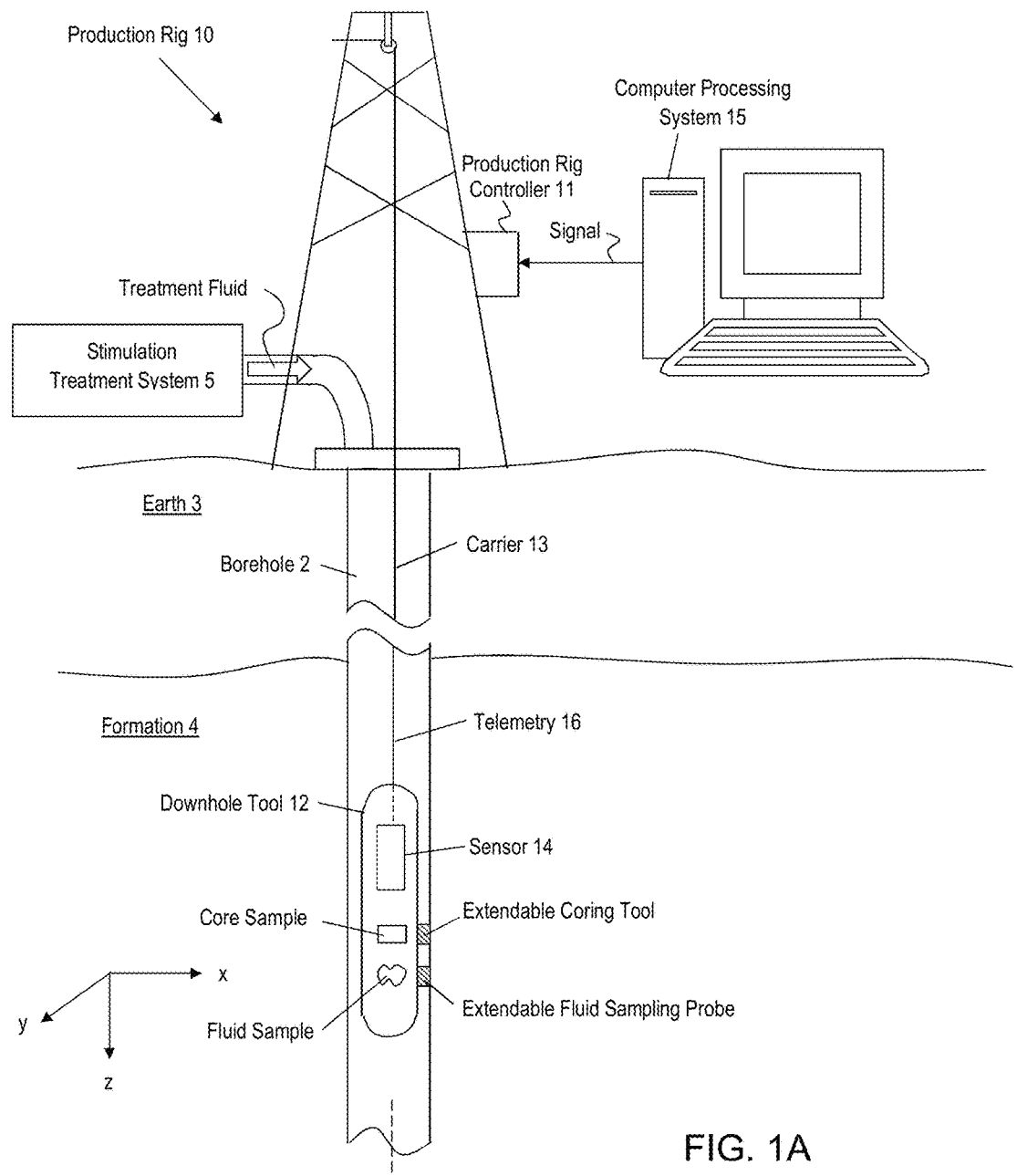
FIGS. 1A and 1B, collectively referred to as FIG. 1, present a cross-sectional view of a production rig for fracturing an earth formation penetrated by a borehole.
Figure 1B:
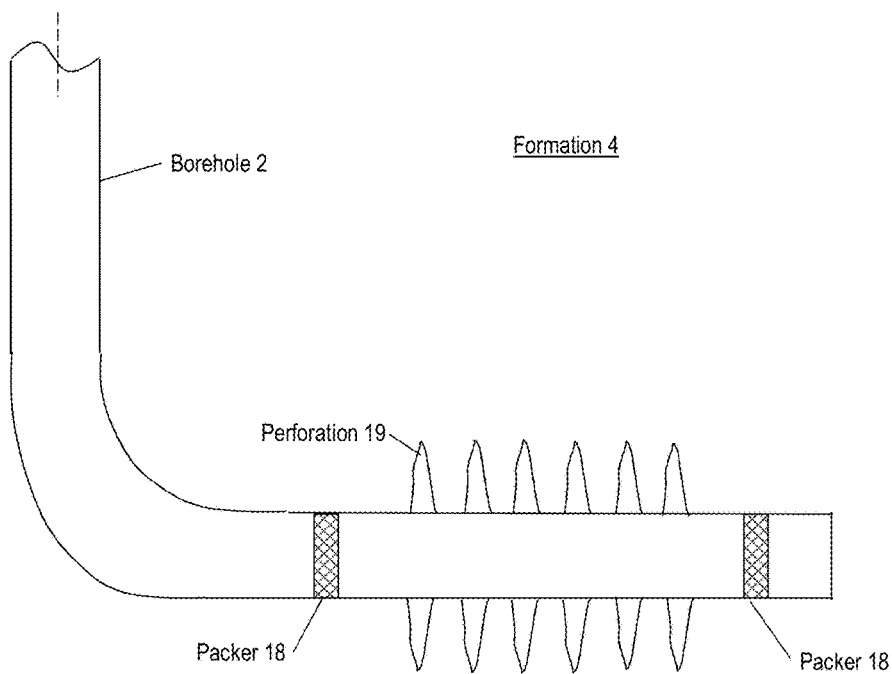

Apparatus for implementing the disclosure herein is now discussed. FIG. 1 is a cross-sectional view of a borehole 2 penetrating the earth 3 having a formation 4, which contains a reservoir of hydrocarbons. The borehole 2 may be vertical as illustrated in FIG. 1A or deviated or horizontal as illustrated in FIG. 1B. A production rig 10 is configured perform completion and production actions relating to extracting hydrocarbons from the formation 4. The production rig 10 includes a production rig controller 11 configured to control various operations performed by the production rig 10. The production rig controller 11 is further configured to receive a signal providing the controller 11 with instructions, such as a set point for example, for controlling the various operations. A stimulation treatment system 5 is coupled to the borehole 2 and configured to apply a stimulation treatment to the formation 4 to increase the permeability of reservoir rock in the formation 4. In one or more embodiments, the stimulation treatment is hydraulic fracturing and the stimulation treatment system 5 is a hydraulic fracturing system. The production rig controller 11 may further control various operations of the stimulation treatment system 5 such as hydraulic pressure, fracture fluid flow rate, and/or amount of proppant (e.g., sand to hold fractures open) injected into the formation 4. Packers 18 may be used to isolate certain sections of the wellbore 2 for hydraulic fracturing purposes. The wellbore 2 and casing (not shown) may include perforations 19 for extracting hydrocarbons from the formation 4.

A downhole tool 12 is disposed in the borehole 2. The downhole tool 12 is conveyed through the borehole 2 by a carrier 13. The carrier 13 may be an armored wireline for wireline logging or a drill string for logging-while-drilling (LWD) or measurement-while-drilling (MWD) embodiments. The downhole tool 12 includes a sensor 14 for sensing a property of the borehole 2 or formation 4. In addition, the downhole tool 12 may be configured to extract a core sample from the formation 4 using an extendable coring tool. The core sample may be analyzed downhole using the sensor 14 to determine one or more properties or parameters of the core sample and thus the formation 4 or it may be analyzed in a laboratory at the surface. Further, the downhole tool 12 may be configured to extract a formation fluid sample using an extendable fluid sample probe. The fluid sample may be analyzed downhole using the sensor 14 to determine one or more properties or parameters of the formation fluid or it may be analyzed in a laboratory at the surface. Sensed downhole properties or parameters may be transmitted to a computer processing system 15 using telemetry 16, which can be the armored wireline, pulsed-mud, or wired drill pipe as non-limiting embodiments.

The computer processing system 15 is configured to perform various operations or computations related to the disclosure herein. These operations include receiving a stimulation scenario that includes one or more parameters used for stimulating the formation. Alternatively, the computer processing system 15 may store one or more stimulation scenarios that may be automatically used to determine a plurality of values of metrics for optimizing hydrocarbon production. Another operation is to create a modified Mohr-Coulomb fracture model (also referred to as modified Mohr-Coulomb model) to simulate behavior of rock formations during a stimulation treatment, such as hydraulic fracturing, to predict a fracture and damage network. The modified Mohr-Coulomb model is discussed in further detail below. Another operation is to convert the fracture and damage network into permeability. In one or more embodiments, the permeability may be provided as a permeability map. This conversion is discussed in further detail below. Yet another operation is to compute an optimization metric for production. A further operation is to iterate the above operations for each stimulation scenario. Another further operation is to select the stimulation scenario that optimizes production based on the computed optimization metrics.

The modified Mohr-Coulomb fracture model (MCF) is now discussed in detail. In geological materials, plastic deformation is defined in terms of slip and dilatation along rough (non-planar) crack surfaces. The term "dilatation" relates to a volume change caused by non-planarity in shear deformation. In other words, a rough surface of a fracture plane will cause the fractured rock to separate in an out-of-plane orientation as it slips along the fracture plane thereby causing fracture surfaces of rock to separate causing the volume of the fracture to increase. The dilatation can be along several small planes and/or along micro-scale planes. In conventional Mohr-Coulomb models, dilatation (change of volume) results from slip non-planarity. The non-planarity is two-dimensional, e.g. it is considered within the plane alone. The modified Mohr-Coulomb fracture model is developed on the basis of three planes. In the current formulation, the third plane is used for the description of dilatation in an out-of-plane orientation. This feature of the modified Mohr-Coulomb fracture model is novel over the conventional Mohr-Coulomb models. Hence, $$M_{ij} = N_{ij}^{\sigma-1}(1+q) - N_{ij}^{\sigma-3}(1-q) + qC_\varphi N_{ij}^{\sigma-2}, \quad (1)$$

where $N_{ij}^{\sigma-1}$, $N_{ij}^{\sigma-2}$ and $N_{ij}^{\sigma-3}$ are stress eigentensors and the superscript sigma indicates that this tensor is aligned with the orientations of principal stresses. (Equation 1 may be referred to as a flow tensor.) Consequently, the tensors are aligned with the first (tensile), second and third (compressive) principal stress orientations. In this notation, all tensors are defined in Cartesian coordinate system, where the components "i" and "j" are equal to one, two and three. The superscript in $N_{ij}^{\sigma-k}$ indicates the orientations of the k-th principal stress, such that $\sigma_1 = N_{ij}^{\sigma-1}\sigma_{ij}$, $\sigma_2 = N_{ij}^{\sigma-2}\sigma_{ij}$ and $\sigma_3 = N_{ij}^{\sigma-3}\sigma_{ij}$. The internal friction parameter q is discussed below. The conventional Mohr-Coulomb model is modified by introducing the non-dimensional function $C_\varphi$. The function is $$C_\varphi = \exp(-\alpha_p \text{Grade}/2)\cos\left(\frac{\pi}{6} + \frac{\varphi}{3}\right)/2. \quad (2)$$

Figure 2:
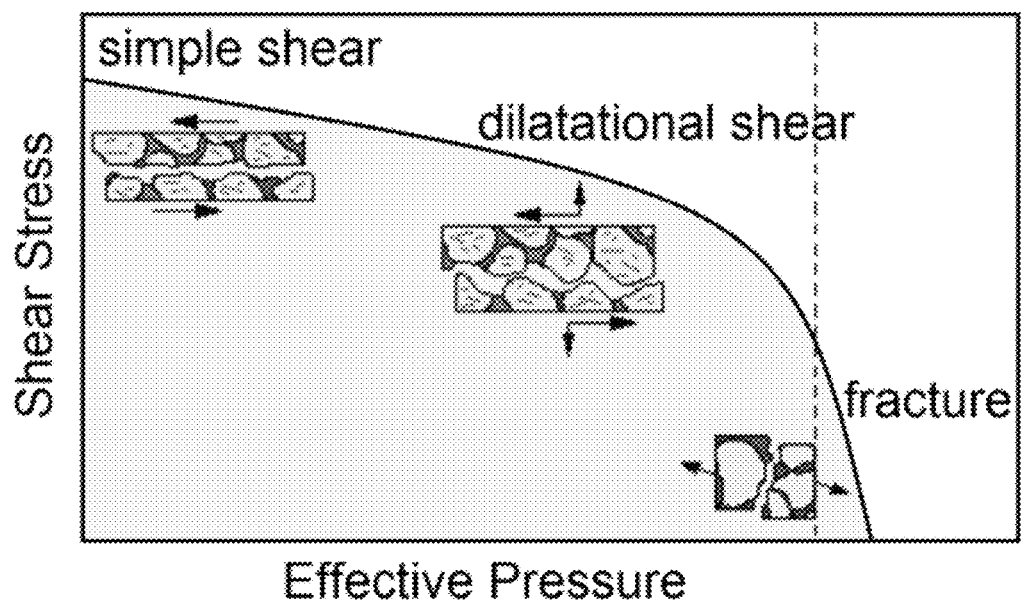
FIG. 2 depicts aspects of a heterogeneous material subjected to shear and developing a rough slip plane.

In this expression, the angle $\varphi$ is $\varphi = \sin^{-1} J_3(27/4J_2^3)^{1/2}$ while the second and third invariants of stress deviator are $J_2 = S_{ij}S_{ij}/2$ and $J_3 = S_{ik}S_{kj}S_{ji}/3$, respectively. Lastly, the stress deviator is $S_{ij} = \sigma_{ij} - \sigma_{kk}\delta_{ij}/3$ and $\delta_{ij}$ and is Kronecker delta. Based on the existing experimental data, the internal friction parameter q is defined in terms of shale grade and is affected by hydrostatic pressure, thus q=q (Grade, pressure). In fact, features such as friction, strength and dilatation are affected by the material's grade, where grade is defined as the kerogen/gas content in liters in one tone of shale. In this model, the reference grade is defined by the parameter $\alpha_p$. Note that when $C_\varphi = 1$, the dilatation part in the flow tensor (1) describes volume change in the Drucker-Prager model. On the other hand, the conventional Mohr-Coulomb model is retrieved when $C_\varphi = 0$. The term $qC_\varphi N_{ij}^{\sigma-2}$ in Eq. 1 describes the dilatation in the out-of-plane orientation. This behavior is illustrated in FIG. 2. A heterogeneous material, as illustrated in FIG. 2, subjected to shear develops a rough slip plane, thus the slip occurs along the plane and in the normal direction to the plane. The normal component of the deformation is responsible for dilatation (volume change). In FIG. 2, a two-dimensional slip non-planarity is shown. In real materials, roughness has a three-dimensional topography and, therefore, dilatation is influenced by asperities along the plane as well as in the lateral orientation.

Following standard methodology of tensor-representation, the flow tensor (1) determines the rate of plastic deformation such that $$\dot{\varepsilon}_{ij}^p = \frac{1}{2} M_{ij} \dot{\varepsilon}_{eq}^p. \quad (3)$$

Figure 3:
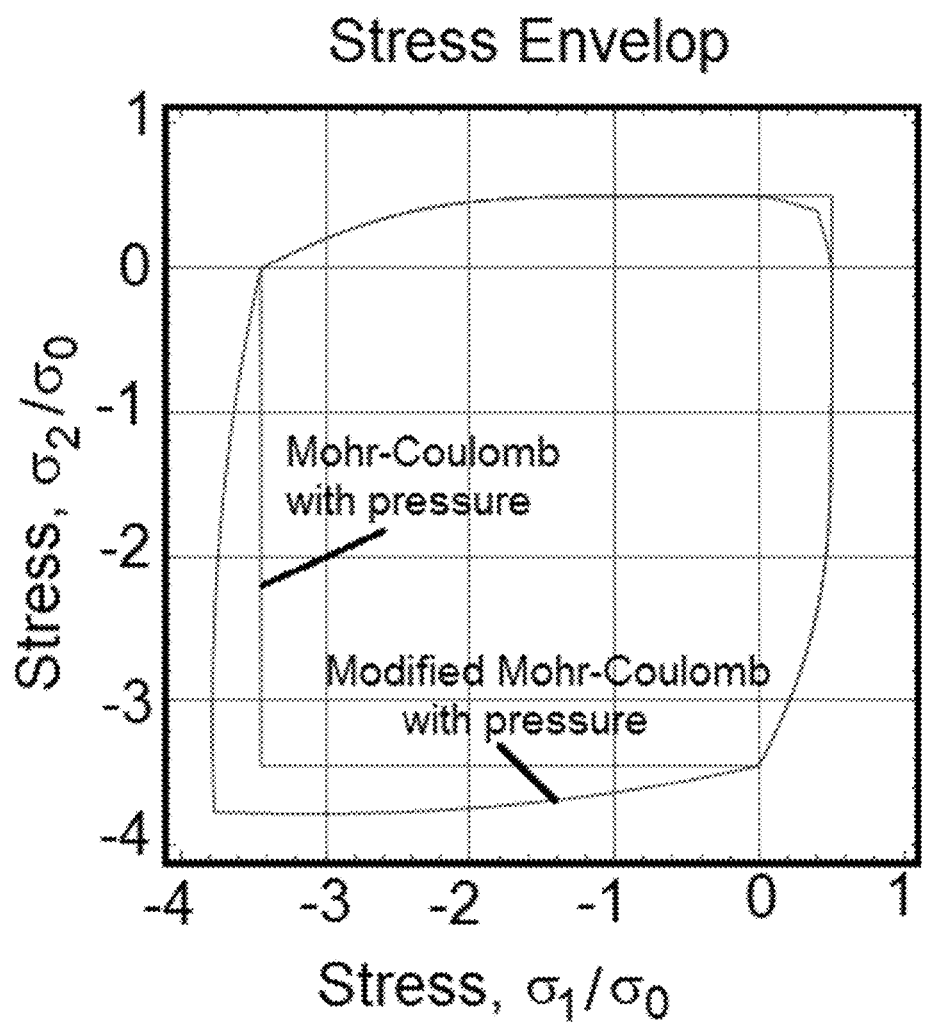
FIG. 3 depicts aspects of a stress envelope for a modified Mohr-Coulomb model compared with a stress envelope for an unmodified Mohr-Coulomb model.

Components of the plastic strain rate are determined by the flow tensor $M_{ij}$, while the magnitude of the plastic strain rate is given by the equivalent plastic rate $\dot{e}_{eq}^p$. In all cases, the subscript and/or superscript "p" indicates that the variable is associated with plastic deformation. The equivalent plastic strain rate $\dot{e}_{eq}^p$ is coupled with equivalent stress. From the known requirement of measure invariance ($\sigma_{ij}\dot{\varepsilon}_{ij}^p = \sigma_{eq}\dot{e}_{eq}^p$), it is concluded that the equivalent stress is expressed in terms of the first, second and third principle stresses. The equivalent stress is defined on the basis of the flow tensor and becomes $\sigma_{eq}^p = M_{ij}\sigma_{ij}/2 = (\sigma_1 - \sigma_3)/2 + q(\sigma_1 + \sigma_3 + C_\varphi \sigma_2)/2$. In here, principal stresses are $\{\sigma_1, \sigma_2, \sigma_3\}$. The equivalent stress scaled through the material's strength $\sigma_0$ is plotted on the principal stress plane $\{\sigma_1, \sigma_2\}$, as illustrated in FIG. 3. In FIG. 3, the stress envelop for the modified Mohr-Coulomb model is compared with the stress envelope of the conventional Mohr-Coulomb model. In both of the models, pressure dependence is included.

Next, the relationship between the equivalent stress and strain rate, which has been developed in previous models for cemented aggregates, geological materials and metals takes the following form $$\dot{e}_{eq}^p = \lambda_p \left(\frac{\sigma_{eq}^p}{\sigma_0}\right)^{n_p} \quad (4)$$

where $\sigma_Q$ is the material's strength given in units of stress and $\sigma_O = \sigma_O(1+q)\exp(-\alpha_p \text{Grade})$ and $n_p$ is a non-dimensional constant. In here, strength $\tilde{\sigma}_O$ describes the resistance to slip and shale grade affects the strength exponentially. The strain rate dependence in (4) is corrected by using the rate-dependent factor $\hat{\lambda}_p = \dot{e}_N^O (\dot{e}_N^t / \dot{e}_N^O)^{\omega_p}$, where the parameter $\omega_p$ is a non-dimensional material constant. Lastly, the scaling parameter $\dot{e}_N^0$ is chosen to be equal to 1/s. The normalized total strain rate is $\dot{e}_N^t = \sqrt{\dot{\varepsilon}_{ij}^t \dot{\varepsilon}_{ij}^t / 2}$, where superscript "t" means total strain and the subscript "N" means that the strain rate is a norm. Units of the strain rate are 1/s.

The modified Mohr-Coulomb fracture model captures the physics of material's dilation due to friction induced damage. In here, the dilatation is affected by the three-dimensional topography of the slip plane roughness. It is noted that the shape of the stress envelop is improved and better reflects the experimentally observed failure surfaces.

As noted above, the computer processing system 15 is configured to predict a fracture and damage network using the modified Mohr-Coulomb fracture model. Geological materials experience fracture in tension, where cracks are formed. Distributed and localized damage occurs in compression and shear.

Next, converting or mapping coalescing micro-cracks to permeability is discussed. In shale and other geological materials, natural porosity, geological and hydro-stress induced damages account for material permeability. Rocks are very heterogeneous materials and, therefore, cracks may nucleate in a distance from each other and then grow. Once the stresses (or stress concentrations) from individual cracks overlap, cracks coalescence and, in this manner, form macro-damages. These processes are highly stochastic. Among the contributing factors are (a) the material's spatial heterogeneity and (b) sufficiently high stresses needed to create fractures. In compression and shear, the magnitude of plastic deformation is directly coupled to the density of interacting micro-cracks. In short, frictional plastic deformation is the measure of shear along pre-existing interfaces (e.g., faults, shear bands, etc.) and along stress-induced fractures. In tension, fracture is much simpler and is associated with the crack growth due to tensile stress.

Both friction-induced dilatation and tensile crack opening promote the formation of interlinked branches. Consequently, these branches become micro-channels suitable for transporting fluids, both injected and those trapped in rock formations. At advanced stages of damage, the rate of crack branching decreases. The transition from one state to another can be violent, and can cause dynamic stress reorganization (dynamic instability).

In the present formulation, the effective permeability $k^{eff}$ has two contributions $$k^{eff} = k^{ref} + k^{frac}$$

where $k^{ref}$ is the reference permeability and $k^{frac}$ is the permeability due to fracture coalescence. Both terms have units of Darcy or equivalent. Non-dimensionalized by the reference permeability, the effective permeability is $$\tilde{k}^{eff} = 1 + \frac{k^{frac}}{k^{ref}} = 1 + \tilde{k}^{frac}.$$

Assuming that the fracture coalescence process is stochastic and obeys Gaussian distribution, the permeability due to fracture coalescence takes the following form $$\tilde{k}^{frac} = k_0 \left[\text{erf}\left(\frac{1}{\alpha_V}\right) - \text{erf}\left(\frac{\epsilon_V^0 - \epsilon_V^{eff}}{\alpha_V \epsilon_V^0}\right)\right]$$

where $k_0$ (non-dimensional) is the magnitude of fracture-induced permeability compared to the reference permeability, and $\alpha_V$ (non-dimensional) and $\epsilon_V^0$ (units of strain) are related to the Gaussian distribution of micro-crack events: micro-crack coalescence peaks when the effective volumetric strain $\epsilon_V^{eff}$ reaches $\epsilon_V^0$. The term $\alpha_V \epsilon_V^0 / \sqrt{2}$ defines the standard deviation of the distribution. While these parameters can take several useful values, possible choices include $k_0 = 1000$, $\alpha_V = 1$ and $\epsilon_V^0 = 0.04$. While erf denotes the error function in in the above equation, functions with similar characteristics can be used interchangeably.

One fundamentally novel aspect of the present disclosure is that the additional third plane in the modified Mohr-Coulomb fracture model increases the probability for the coalescence of micro-cracks, and thus for the formation of micro-channels, in the out of plane direction. Thus, the description herein of damage with three planes is intrinsically linked to an increase in permeability.

Figure 4:
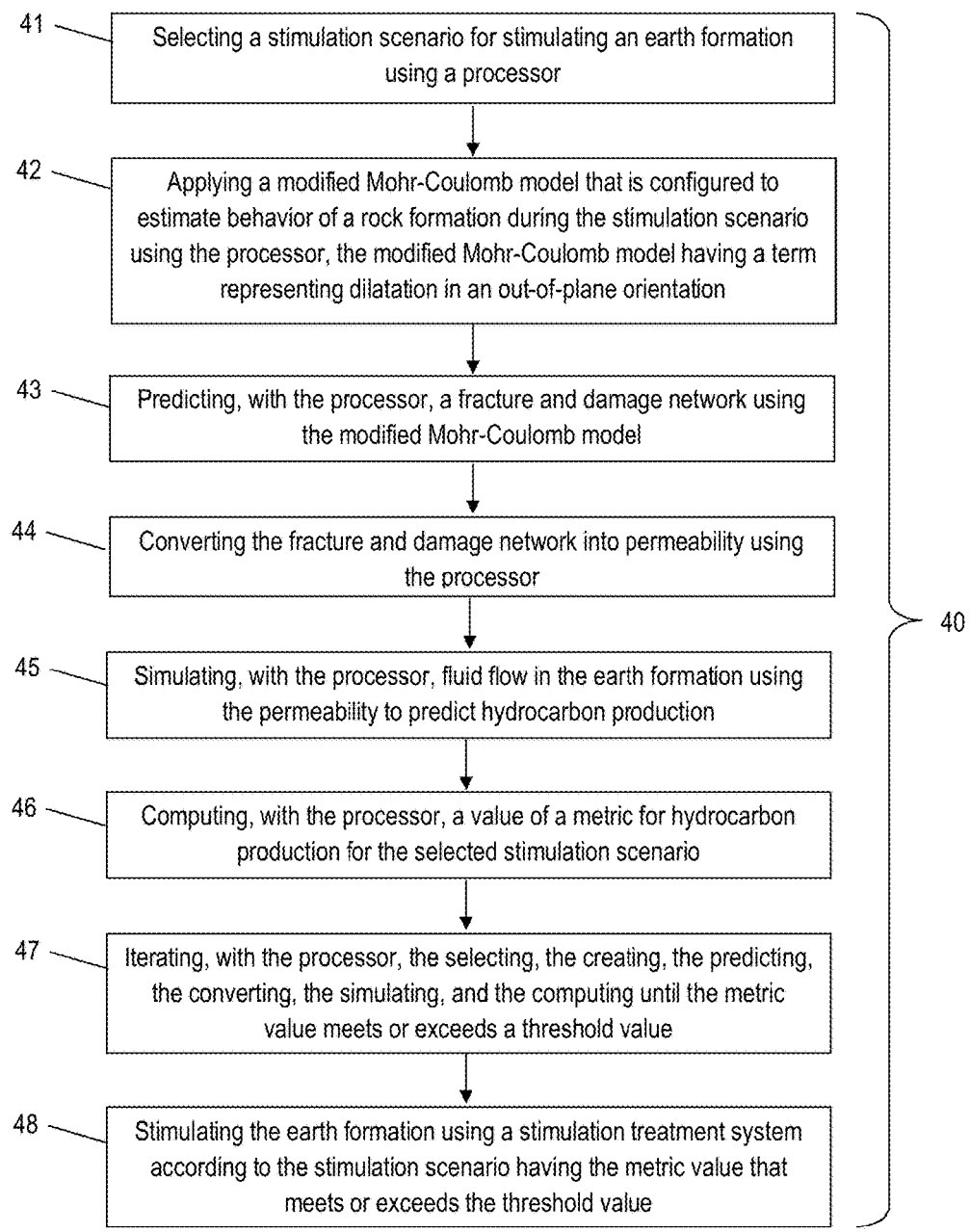
FIG. 4 is a flow chart for a method for selecting a hydrocarbon production action for extracting hydrocarbons from an earth formation.

FIG. 4 is a flow chart for a method 40 for stimulating an earth formation according to a selected stimulation scenario for extracting hydrocarbons from the earth formation. Block 41 calls for selecting a stimulation scenario for stimulating the earth formation using a processor. The stimulation may include one or more parameters used for the stimulation. In one or more embodiments, the stimulation includes hydraulic fracturing. In one or more embodiments, the stimulation scenario for hydraulic fracturing may include a pumping pressure, a fluid pumping rate over a time interval, specifying and pumping one or more types of fracturing fluid, and/or specifying and pumping one or more proppants into fractures. Block 42 calls for applying a modified Mohr-Coulomb model that is configured to estimate behavior of a rock formation during the stimulation scenario using the processor, the modified Mohr-Coulomb model having a term representing dilatation in an out-of-plane orientation. Block

43 calls for predicting, with the processor, a fracture and damage network using the modified Mohr-Coulomb model. Block 44 calls for converting the fracture and damage network into permeability using the processor. This block may also include constructing a permeability map that illustrates formation permeability as a function of location in the formation. Block 45 calls for simulating, with the processor, fluid flow in the earth formation using the permeability to predict hydrocarbon production. Block 46 calls for computing, with the processor, a value of a metric for hydrocarbon production for the selected stimulation scenario. This block may also include selecting or defining the type of metric. Non-limiting embodiments of the metric include maximum cumulative production over a specific time interval, lowest rate of decline, and highest peak production. Block 47 calls for iterating the selecting, the creating, the predicting, the converting, the simulating, and the computing until the metric meets or exceeds a threshold value. The term "exceeds" may relate to being above or below the threshold value depending on how the metric is optimized. In one or more embodiments, the threshold value may be set to the highest productive metric value (e.g., volume of produced hydrocarbons) selected from all the computed metric values corresponding to all the stimulation scenarios. Block 48 calls for stimulating the earth formation according to the stimulation scenario having the metric that meets or exceeds the threshold value.

The method 40 may also include identifying parameter values of the earth formation from core samples of the earth formation, parameter values obtained from similar earth formations, and/or known reference data. Core samples may be obtained using a downhole coring tool configured to drill into a sidewall of the borehole and extract a core sample. The core samples may be analyzed downhole or in a surface laboratory. Similarly, the method 40 may also include identifying parameter values of fluids in the earth formation. Formation fluid parameter values may be determined from fluid samples obtained from the earth formation, fluid samples obtained from similar earth formations, and/or known reference data of fluids. Fluid samples may be obtained using a downhole fluid sampling tool configured to extract a sample of formation fluid through a wall of the borehole. The fluid samples may be analyzed downhole or in a surface laboratory. The rock formations and the formation's fluid parameter values may be used for creating the modified Mohr-Coulomb fracture model, predicting the fracture and damage network, converting the fracture and damage network into permeability, and simulating fluid flow in the earth formation using the permeability to predict hydrocarbon production. For instance, material strength is affected by grade of the material (e.g., Equation 4). Also shale grade contributes to the change in volume in the expression for the third plane in Equations 1 and 2.

In support of the teachings herein, various analysis components may be used, including a digital and/or an analog system. For example, the stimulation treatment system 5, the production rig 10, the production rig controller 11, the downhole tool 12, the sensor 14, the computer processing system 15, and/or telemetry 16 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for stimulating an earth formation according to a selected stimulation scenario for extracting hydrocarbons from the earth formation, the method comprising:

selecting a stimulation scenario for stimulating the earth formation using a processor;

applying a modified Mohr-Coulomb model that is configured to estimate behavior of a rock formation during the stimulation scenario using the processor, the modified Mohr-Coulomb model having a term representing dilatation in an out-of-plane orientation;

predicting, with the processor, a fracture and damage network using the modified Mohr-Coulomb model;

converting the fracture and damage network into permeability using the processor;

simulating, with the processor, fluid flow in the earth formation using the permeability to predict hydrocarbon production;

computing, with the processor, a value of a metric for hydrocarbon production for the selected stimulation scenario;

iterating, with the processor, the selecting, the applying, the predicting, the converting, the simulating, and the computing until the metric value meets or exceeds a threshold value; and stimulating the earth formation using a stimulation treatment system according to the stimulation scenario having the metric value that meets or exceeds the threshold value;

wherein the term representing dilatation in an out-of-plane orientation with respect to a flow tensor is $qC_\varphi N_{ij}^{o-2}$ where q is an internal friction parameter, $C_\varphi$ is a non-dimensional function, and $N_{ij}^{o-2}$ is a stress eigentensor aligned with the orientation of the second principal stress.

2. The method according to claim 1, further comprising identifying a formation parameter value of the earth formation.

3. The method according to claim 2, wherein identifying comprises obtaining and analyzing a core sample of the earth formation.

4. The method according to claim 1, further comprising identifying a fluid parameter value of formation fluid.

5. The method according to claim 4, wherein identifying comprises obtaining and analyzing a fluid sample of the formation fluid.

6. The method according to claim 1, wherein stimulating comprises hydraulic fracturing of the earth formation using a hydraulic fracturing system.

7. The method according to claim 1, wherein:

$$C_\varphi = \exp(-\alpha_p \text{Grade}/2)\cos\left(\frac{\pi}{6} + \frac{\varphi}{3}\right)/2$$

where Grade is kerogen to gas content; $\alpha_p$ is a reference grade of kerogen to gas content; angle $\varphi$ is $\varphi = \sin^{-1} J_3(27/4J_2^3)^{1/2}$, while the second and third invariants of stress deviator are $J_2 = S_{ij}S_{ij}/2$ and $J_3 = S_{ik}S_{kj}S_{ji}/3$; the stress deviator is $S_{ij} = \sigma_{ij} - \sigma_{kk}\delta_{ij}/3$ and $\delta_{ij}$ is Kronecker delta; $\sigma_{ij}$ is a stress tensor; and $\sigma_{kk}$ represents the diagonal components of $\sigma_{ij}$.

8. The method according to claim 1, wherein converting comprises calculating effective permeability $$\tilde{k}^{eff} = 1 + \frac{k^{frac}}{k^{ref}} = 1 + \tilde{k}^{frac}$$

with $$\tilde{k}^{frac} = k_0\left[\text{erf}\left(\frac{1}{\alpha_V}\right) - \text{erf}\left(\frac{\in_V^0 - \in_V^{eff}}{\alpha_V \in_V^0}\right)\right]$$

where $k_O$ is non-dimensional and the magnitude of fracture-induced permeability compared to reference permeability $k^{ref}$; $k^{frac}$ is permeability due to fracture coalescence; $\alpha_V$ is non-dimensional and $\in_V^0$ in units of strain are related to the Gaussian distribution of micro-crack events such that micro-crack coalescence peaks are obtained when the effective volumetric strain $\in_V^{eff}$ reaches $\in_V^0$; and the term $\alpha_V \in_V^0/\sqrt{2}$ defines the standard deviation of the distribution.

9. The method according to claim 8, wherein $k_0 = 1000$, $\alpha_V = 1$ and $\in_V^0 = 0.04$.

10. A system for stimulating an earth formation according to a selected stimulation scenario for extracting hydrocarbons from the earth formation, the system comprising:

a stimulation treatment system configured to stimulate the earth formation according to a stimulation scenario for extraction of the hydrocarbons;

a processor configured for:

selecting a stimulation scenario for stimulating the earth formation;

applying a modified Mohr-Coulomb model that is configured to estimate behavior of a rock formation during the stimulation scenario, the modified Mohr-Coulomb model having a term representing dilatation in an out-of-plane orientation;

predicting a fracture and damage network using the modified Mohr-Coulomb model;

converting the fracture and damage network into permeability;

simulating fluid flow in the earth formation using the permeability to predict hydrocarbon production;

computing a value of a metric for hydrocarbon production for the selected stimulation scenario;

iterating the selecting, the applying, the predicting, the converting, the simulating, and the computing until the metric value meets or exceeds a threshold value; and stimulating the earth formation using the stimulation treatment system according to the stimulation scenario having the metric value that meets or exceeds the threshold value;

wherein the term representing dilatation in an out-of-plane orientation with respect to a flow tensor is $qC_\varphi N_{ij}^{o-2}$ where q is an internal friction parameter, $C_\varphi$ is a non-dimensional function, and $N_{ij}^{o-2}$ is a stress eigentensor aligned with the orientation of the second principal stress.

11. The system according to claim 10, wherein the stimulation treatment system is a hydraulic fracturing system.

12. The system according to claim 10, wherein:

$$C_\varphi = \exp(-\alpha_p \text{Grade}/2)\cos\left(\frac{\pi}{6} + \frac{\varphi}{3}\right)/2$$

where Grade is kerogen to gas content; $\alpha_p$ is a reference grade of kerogen to gas content; angle $\varphi$ is $\varphi = \sin^{-1} J_3(27/4J_2^3)^{1/2}$, while the second and third invariants of stress deviator are $J_2 = S_{ij}S_{ij}/2$ and $J_3 = S_{ik}S_{kj}S_{ji}/3$; and the stress deviator is $S_{ij} = \sigma_{ij} - \sigma_{kk}\delta_{ij}/3$ and $\delta_{ij}$ is Kronecker delta; $\sigma_{ij}$ is a stress tensor; and $\sigma_{kk}$ represents the diagonal components of $\sigma_{ij}$.

13. The system according to claim 10, wherein converting comprises calculating effective permeability $$\tilde{k}^{eff} = 1 + \frac{k^{frac}}{k^{ref}} = 1 + \tilde{k}^{frac}$$

with $$\tilde{k}^{frac} = k_0 \left[ \text{erf}\left(\frac{1}{\alpha_V}\right) - \text{erf}\left(\frac{\epsilon_V^0 - \epsilon_V^{eff}}{\alpha_V \epsilon_V^0}\right) \right]$$

where $k_C$ is non-dimensional and the magnitude of fracture-induced permeability compared to reference permeability $k^{ref}$; $k^{frac}$ is permeability due to fracture coalescence; $\alpha_V$ is non-dimensional and $\epsilon_V^0$ in units of strain are related to the Gaussian distribution of micro-crack events such that micro-crack coalescence peaks are obtained when the effective volumetric strain $\epsilon_V^{eff}$ reaches $\epsilon_V^0$; and the term $\alpha_V \epsilon_V^0 / \sqrt{2}$ defines the standard deviation of the distribution.

14. The system according to claim 13, wherein $k_0=1000$, $\alpha_V=1$ and $\epsilon_V^0=0.04$.

* * * * *